US009407517B2

(12) United States Patent
Vijayarangan et al.

(10) Patent No.: US 9,407,517 B2
(45) Date of Patent: Aug. 2, 2016

(54) SYSTEM AND METHOD FOR DETERMINING NUMBER OF COMPUTING RESOURCES FOR EXECUTING A PLURALITY OF JOBS

(71) Applicant: Tata Consultancy Services Limited, Mumbai, Maharashtra (IN)

(72) Inventors: Natarajan Vijayarangan, Tamil Nadu (IN); Muralidharan Somasundaram, Tamil Nadu (IN); Kishore Padmanabhan, Tamil Nadu (IN)

(73) Assignee: Tata Consultancy Services Limited, Mumbai (IN)

( * ) Notice: Subject to any disclaimer, the term of this patent is extended or adjusted under 35 U.S.C. 154(b) by 162 days.

(21) Appl. No.: 14/505,669

(22) Filed: Oct. 3, 2014

(65) Prior Publication Data

US 2015/0180737 A1 Jun. 25, 2015

(30) Foreign Application Priority Data

Dec. 23, 2013 (IN) .......................... 4018/MUM/2013

(51) Int. Cl.
*G06F 9/46* (2006.01)
*H04L 12/24* (2006.01)
*G06Q 10/06* (2012.01)

(52) U.S. Cl.
CPC ...... *H04L 41/5054* (2013.01); *G06Q 10/06313* (2013.01)

(58) Field of Classification Search
None
See application file for complete search history.

(56) References Cited

U.S. PATENT DOCUMENTS

| 5,923,873 | A | * | 7/1999 | Massey | G06F 9/50 718/100 |
|---|---|---|---|---|---|
| 7,734,676 | B2 | | 6/2010 | Dritschler et al. | |
| 8,650,298 | B2 | | 2/2014 | Daly et al. | |
| 8,863,096 | B1 | * | 10/2014 | Bucur | G06F 9/5088 717/124 |
| 9,183,050 | B2 | * | 11/2015 | Vijayarangan | G06F 9/4887 |
| 2007/0240161 | A1 | * | 10/2007 | Prabhakar | G06F 9/5044 718/104 |
| 2013/0346994 | A1 | * | 12/2013 | Chen | G06F 9/5044 718/104 |
| 2015/0143363 | A1 | * | 5/2015 | Gombert | G06F 9/45533 718/1 |

OTHER PUBLICATIONS

Lik Gan Alex Sung, "Autonomic Resource Management for a Cluster that Executes Batch Jobs", Waterloo, Ontario, Canada, 2006 (Thesis).
Utilization difference between a multiple server, single queue and a multiple server, multiple queue system, Jun. 19, 2013.
Xiaofeng Zhao, "Approximation methods for the standard deviation of flow times in the g/g/s queue", Aug. 2007 (Dissertation).

(Continued)

*Primary Examiner* — Emerson Puente
*Assistant Examiner* — Mehran Kamran
(74) *Attorney, Agent, or Firm* — Shumaker, Loop & Kendrick, LLP

(57) ABSTRACT

Method and system for determining the number of computing resources for executing a plurality of jobs. In accordance with the method and the system, the plurality of jobs along with a plurality of variables associated to the plurality of jobs may be received. The plurality of variables may include a mean processing time ($\mu$), a standard deviation ($\sigma$), a service level agreement ($\alpha$), and a confidence level (1-$\alpha$). After the receipt of the plurality of variables, an inverse parameter ($\gamma$) may be determined using the mean processing time ($\mu$), the standard deviation ($\sigma$), and the confidence level (1-$\alpha$). Further, a queue length (k) may be computed based upon the total processing time (T), the mean processing time ($\mu$), the standard deviation ($\sigma$), and the inverse parameter ($\gamma$). Finally, the queue length (k) and the number of jobs (n) may be processed in order to determine the number of computing resources.

7 Claims, 3 Drawing Sheets

(56) References Cited

OTHER PUBLICATIONS

Bhattacharja, Bonane, "A better numerical approach for finding the steady-state waiting time and the average queue length of a system for the arithmetic GI/G/1 queue", Nov. 2011 (Thesis).

Vidhyacharan Bhaskar, & G. Lavanya, "Equivalent single-queue—single-server model for a Pentium processor", Applied Mathematical Modelling, vol. 34, p. 2531-2545 (2010); online pub. Nov. 20, 2009.

* cited by examiner

SYSTEM AND METHOD FOR DETERMINING NUMBER OF COMPUTING RESOURCES FOR EXECUTING A PLURALITY OF JOBS

CROSS-REFERENCE TO RELATED APPLICATIONS AND PRIORITY

The present application claims priority from Indian Patent Application No. 4018/MUM/2013 filed on Dec. 23, 2013.

TECHNICAL FIELD

The present disclosure relates in general to systems and methods for determining number of computational resources required for executing multiple jobs received in real time.

BACKGROUND

In a computing network environment, multiple computing resources are deployed at different geographical locations in order to execute jobs associated with software applications of different technologies. The execution of the jobs is managed through a service level agreement (SLA) between a service provider and a customer. The service provider facilitates the execution of the jobs belonging to the customer. The customer may prescribe its requirements regarding the execution of the jobs through the SLA. In one example, the customer may set a pre-defined time limit for the execution of the jobs. Based on the requirements of the customer, the service provider may have to accordingly plan and execute the jobs, so that the SLA is complied.

In order to comply with the SLA, the service provider may have to effectively analyze supply and demand of the computing resources, such that the jobs are executed within the pre-defined time limit set as per the SLA. However, since the arrival of the jobs is dynamic, it becomes a technical challenge to effectively plan and allocate the computing resources. In view of lack of the effective planning and the allocation of the computing resources, it may be observed that few of the computing resources are overloaded with more jobs while the other computing resources may be receiving fewer jobs or may be idle. This may lead to ineffective utilization of the computing resources and hence may affect the completion of the execution of the jobs as per the SLA.

SUMMARY

Without limiting scope, disclosed are exemplary systems and methods for determining number of computing resources for executing a plurality of jobs and the aspects are further described below in the detailed description.

In one implementation, a system for determining a number of computing resources for executing a plurality of jobs (n) in a total processing time (T) is disclosed. The system may include a processor and a memory coupled to the processor for executing a plurality of modules stored in the memory. The plurality of modules may include a receiving module, and a determining module. The receiving module may be configured to receive the plurality of jobs (n) to be executed by a software application, and a plurality of variables associated with the plurality of jobs (n). The plurality of variables may include a mean processing time ($\mu$), a standard deviation ($\sigma$), a service level agreement ($\alpha$), and a confidence level ($1-\alpha$). The mean processing time ($\mu$) may indicate average time required for executing each job. Further, the standard deviation ($\sigma$) may indicate a variance in the mean processing time ($\mu$). The service level agreement ($\alpha$) may be indicative of a maximum time allowable in addition to the total processing time (T) for executing the plurality of jobs (n). The determining module may be configured to determine an inverse parameter ($\gamma$) using the mean processing time ($\mu$), the standard deviation ($\sigma$), and the confidence level ($1-\alpha$). The determining module may further be configured to compute a queue length (k) based upon the total processing time (T), the mean processing time ($\mu$), the standard deviation ($\sigma$), and the inverse parameter ($\gamma$). In one aspect, the queue length (k) may indicate a maximum number of jobs capable of being executed simultaneously by a single computing resource. In one embodiment, the queue length (k) may be computed using a formula $\sqrt{k}=-\sigma\gamma\pm\sqrt{(\sigma^2\gamma^2+4T\mu)}/2\mu$. The determining module may further be configured to process the queue length (k) and the plurality of jobs (n) in order to determine the number of computing resources required for the execution of the plurality of the jobs (n). In one embodiment, the number of computing resources may be determined based on a ceiling function of the division of the plurality of jobs (n) and the queue length (k).

In another implementation, a method for determining a number of computing resources for executing a plurality of jobs (n) in a total processing time (T) is disclosed. The method may include receiving the plurality of jobs (n) to be executed by a software application, and a plurality of variables associated with the plurality of jobs (n). The plurality of variables may include a mean processing time ($\mu$), a standard deviation ($\sigma$), a service level agreement ($\alpha$), and a confidence level ($1-\alpha$). The mean processing time ($\mu$) may indicate average time required for executing each job. Further, the standard deviation ($\sigma$) may indicate a variance in the mean processing time ($\mu$). The service level agreement ($\alpha$) may be indicative of a maximum time allowable in addition to the total processing time (T) for executing the plurality of jobs (n). The method may further include determining an inverse parameter ($\gamma$) using the mean processing time ($\mu$), the standard deviation ($\sigma$), and the confidence level ($1-\alpha$). The method may further include computing a queue length (k) based upon the total processing time (T), the mean processing time ($\mu$), the standard deviation ($\sigma$), and the inverse parameter ($\gamma$). In one aspect, the queue length (k) may indicate a maximum number of jobs capable of being executed simultaneously by a single computing resource. In one embodiment, the queue length (k) may be computed using a formula $\sqrt{k}=-\sigma\gamma\pm\sqrt{(\sigma^2\gamma^2+4T\mu)}/2\mu$. The method may further include processing the queue length (k) and the plurality of jobs (n) in order to determine the number of computing resources required for the execution of the plurality of the jobs (n). In one embodiment, the number of computing resources may be determined based on a ceiling function of the division of the plurality of jobs (n) and the queue length (k). In an aspect, at least one of the receiving, the determining, the computing and the processing are performed via a processor using a set of instructions stored in a memory.

In yet another implementation, a computer program product having embodied thereon a computer program for determining a number of computing resources for executing a plurality of jobs (n) in a total processing time (T) is disclosed. The computer program product may include an instruction for receiving the plurality of jobs (n) to be executed by a software application, and a plurality of variables associated with the plurality of jobs (n). The plurality of variables may include a mean processing time ($\mu$), a standard deviation ($\sigma$), a service level agreement ($\alpha$), and a confidence level ($1-\alpha$). The mean processing time ($\mu$) may indicate average time required for executing each job. Further, the standard deviation ($\sigma$) may indicate a variance in the mean processing time ($\mu$). The service level agreement ($\alpha$) may be indicative of a maximum time allowable in addition to the total processing time (T) for executing the plurality of jobs (n). The computer program product may include an instruction for determining an inverse parameter (γ) using the mean processing time (μ), the standard deviation (σ), and the confidence level (1-α). The computer program product may further include an instruction for computing a queue length (k) based upon the total processing time (T), the mean processing time (μ), the standard deviation (σ), and the inverse parameter (γ). In one aspect, the queue length (k) may indicate a maximum number of jobs capable of being executed simultaneously by a single computing resource. In one embodiment, the queue length (k) may be computed using a formula $\sqrt{k}=-\sigma\gamma\pm\sqrt{(\sigma^2\gamma^2+4T\mu)}/2\mu$. The computer program product may further include an instruction for processing the queue length (k) and the plurality of jobs (n) in order to determine the number of computing resources required for the execution of the plurality of the jobs (n). In one embodiment, the number of computing resources may be determined based on a ceiling function of the division of the plurality of jobs (n) and the queue length (k).

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. Disclosed are systems and methods for determining a number of computing resources for executing a plurality of jobs (n) in a total processing time (T) are described. The systems and methods enable effective and efficient technique of determining the number of computing resources required to execute the plurality of jobs (n).

In order to determine the number of computing resources, at first, an outsourcee entity may receive, from an outsourcing entity, the number of jobs (n) along with a plurality of variables associated with the executing of the jobs (n). The plurality of variables may comprise a mean processing time (μ), a standard deviation (σ), a service level agreement (α), and a confidence level (1-α). Based on the mean processing time (μ), the standard deviation (σ), and the confidence level (1-α), further, an inverse parameter (γ) may be determined. The service level agreement (α) indicates a maximum deviation allowable with respect to the total processing time (T) in the executing of the plurality of jobs (n).

Subsequent to the determination of the inverse parameter (γ), a queue length (k) may be computed based upon the total processing time (T), the mean processing time (μ), the standard deviation (σ), and the inverse parameter (γ). In one embodiment, the queue length (k) may indicate 'k' number of jobs of the plurality of jobs (n) being executed simultaneously by a single computing resource. Specifically, the queue length (k) may indicate the capability of the single computing resource to process the k number of jobs of the plurality of jobs (n). After the computation of the queue length (k), the number of computing resources required for the executing the plurality of jobs (n) may be determined. In one example, the number of computing resources may be determined based on a ceiling function of the division of the plurality of jobs (n) and the queue length (k).

While aspects of described system and method for determining a number of computing resources for executing a plurality of jobs may be implemented in any number of different computing systems, environments, and/or configurations, the embodiments are described in the context of the following exemplary system.

Figure 1:
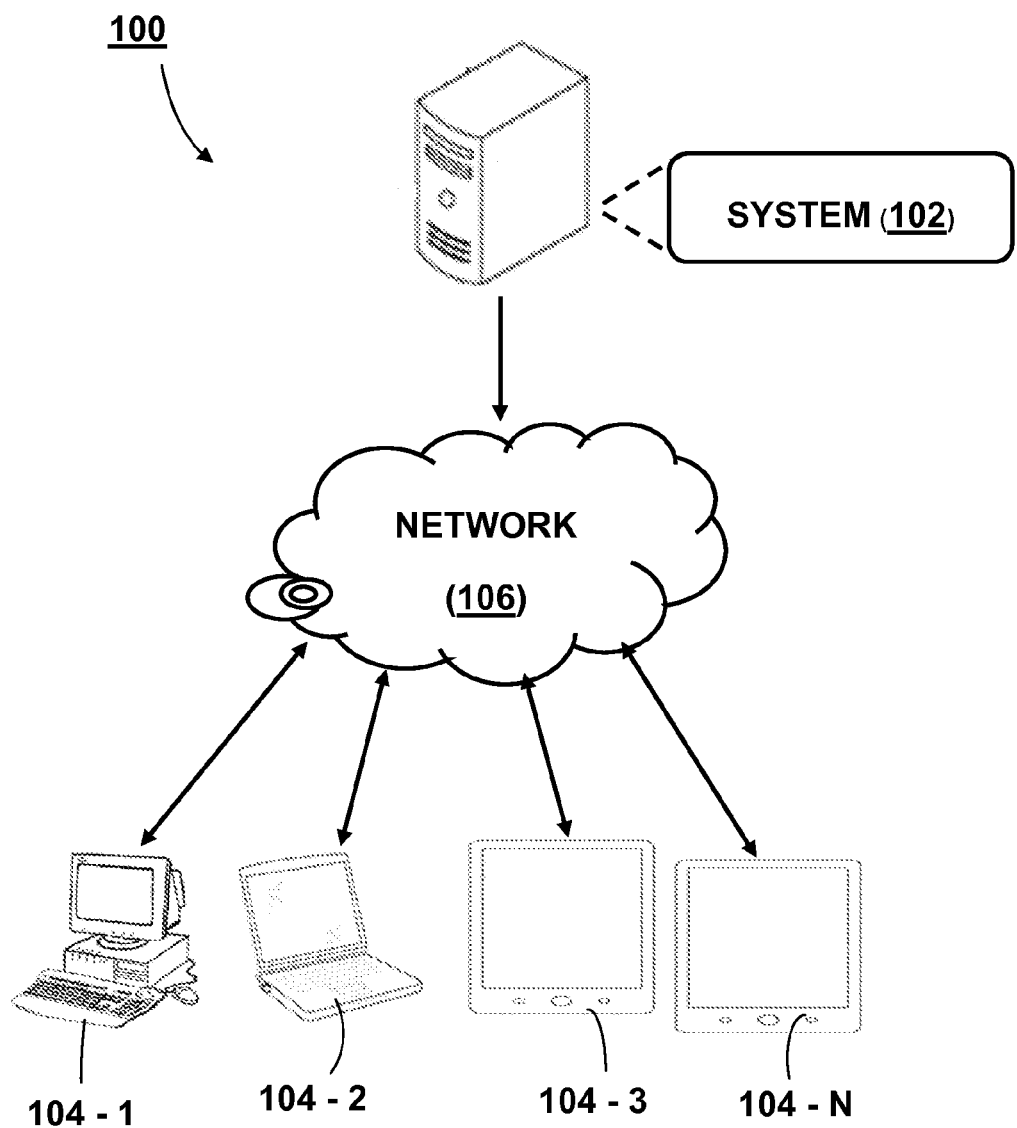
FIG. 1 illustrates a network implementation of a system for determining a number of computing resources for executing a plurality of jobs, in accordance with an embodiment of the present disclosure.

Referring now to FIG. 1, a network implementation 100 of a system 102 for determining a number of computing resources for executing a plurality of jobs (n) in a total processing time (T) is illustrated, in accordance with an embodiment of the present disclosure. In one embodiment, the system 102 may be configured to receive the plurality of jobs (n) to be executed by a software application, and a plurality of variables associated with the plurality of jobs (n). The plurality of variables may comprise a mean processing time (μ), a standard deviation (σ), a service level agreement (α), and a confidence level (1-α). The mean processing time (μ) may indicate average time required for executing each job. Further, the standard deviation (σ) may indicate a variance in the mean processing time (μ). The service level agreement (α) may be indicative of a maximum time allowable in addition to the total processing time (T) for executing the plurality of jobs (n). The system 102 may be configured to determine an inverse parameter (γ) using the mean processing time (μ), the standard deviation (σ), and the confidence level (1-α). The system 102 may be configured to compute a queue length (k) based upon the total processing time (T), the mean processing time (μ), the standard deviation (σ), and the inverse parameter (γ). In one embodiment, the queue length (k) may indicate a maximum number of jobs capable of being executed simultaneously by a single computing resource. The system 102 may be configured to process the queue length (k) and the plurality of jobs (n) in order to determine the number of computing resources required for the execution of the plurality of the jobs (n).

Although the present disclosure is explained considering that the system 102 is implemented as a server, it may be understood that the system 102 may also be implemented in a variety of computing systems, such as a laptop computer, a desktop computer, a notebook, a workstation, a mainframe computer, a network server, and the like. In one implementation, the system 102 may be implemented in a cloud-based environment. It will be understood that the system 102 may be accessed by multiple users through one or more user devices 104-1, 104-2, 104-3, and 104-N, collectively also referred to as a user device 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
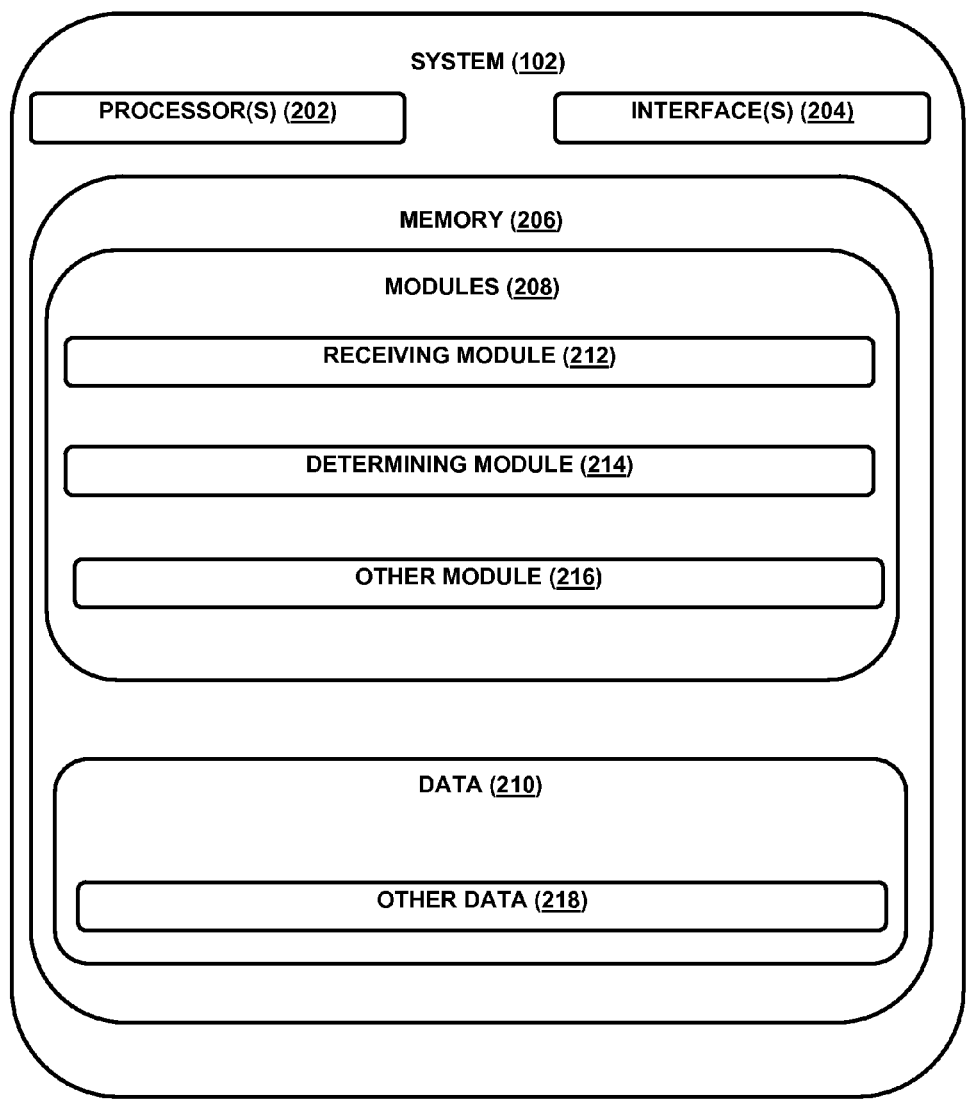
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user device 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a receiving module 212, a determining module 214, and other module 216. The other module 216 may include programs or coded instructions that supplement applications and functions of the system 102.

The data 210, amongst other things, serves as a repository for storing data processed, received, and generated by one or more of the modules 208. The data 210 may also other data 218. The other data 218 may include data generated as a result of the execution of one or more modules in the other module 216.

In one implementation, at first, a user may use the user device 104 to access the system 102 via the I/O interface 204. The user may register themselves using the I/O interface 204 in order to use the system 102. The working of the system 102 using the plurality of modules 208 is explained in detail referring to FIGS. 2 and 3 as explained below. In order to understand the working of the disclosure, consider an outsourcing entity has outsourced execution of a plurality of jobs, to an outsourcee entity. The outsourcee may have to allocate desired number of computing resources such as servers, hardware and/or software components, and the like in order to execute the plurality of jobs, as per the requirements of the outsourcing entity. The plurality of jobs may be continuously arriving for the execution at the outsourcee entity location, and hence need to be executed appropriately, satisfying the requirements of the outsourcing entity. The present system 102 enables the outsourcee entity to determine sufficient number of the computing resources to execute the plurality of jobs, the details of which is further explained as below.

Receiving Module 212

In an embodiment, the receiving module 212, as shown in FIG. 2, may be configured to receive a plurality of requirements of the outsourcing entity. The plurality of requirements may be associated to the execution of the plurality of jobs. In one embodiment, the receiving module 212 may be configured to receive the plurality of jobs (n). The plurality of jobs (n) has to be executed by one or more software applications belonging to the outsourcee entity. In one embodiment, the plurality of jobs (n) may be of similar or diverse skill types, and may be distributed across one or more geographical locations belonging to the outsourcee entity. In one example, the plurality of jobs (n) may be of the skill types comprising software development, software maintenance, Business Process Outsourcing (BPO), and the like. In one embodiment, the one or more software applications may require effective number of the computing resources in order to execute the plurality of jobs (n) as per the plurality of requirements. The plurality of requirements further comprises receiving by the receiving module 212, a plurality of variables associated to the plurality of jobs (n), wherein the plurality of requirements are received from the outsourcing entity. In one embodiment, the plurality of variables comprises a mean processing time ($\mu$), a standard deviation ($\sigma$), a service level agreement ($\alpha$), and a confidence level ($1-\alpha$).

In an embodiment, the mean processing time ($\mu$) may indicate average time required for executing each job. In one example, assume the number of jobs (n) is ten, out of which four jobs require 50 minutes for the execution. Similarly, assume that the remaining jobs (i.e. six out of 10) require 60 minutes for the execution, then the mean processing time ($\mu$) required for the execution of all ten jobs will be 44 minutes. Similarly, based on the skill type of the number of jobs (n) and their continuous arrival in batches, the mean processing time ($\mu$) indicating the execution of each job corresponding to a batch of jobs may be received. Based on the requirements of the outsourcing entity, there may be a feasibility to allow a variance in the mean processing time ($\mu$). The standard deviation ($\sigma$) indicates such variance in the mean processing time ($\mu$). In one example, assume that the mean processing time ($\mu$) is 50 minutes, and the standard deviation ($\sigma$) is also 50 minutes, then the variance allowable in the mean processing time ($\mu$) will be square of the standard deviation ($\sigma$), i.e. $\sigma^2$, which will be 2500, in the aforementioned scenario.

In one embodiment, along with the mean processing time ($\mu$), and the standard deviation ($\sigma$), the outsourcee entity may also have to execute the plurality of jobs (n) based on the service level agreement ($\alpha$). The service level agreement ($\alpha$)

may be indicative of a maximum time allowable in addition to a total processing time (T) for executing the plurality of jobs (n). In one embodiment, the total processing time (T) may indicate the total time limit prescribed by the outsourcing entity to the outsourcee entity in order to complete the execution of the plurality of jobs (n). As per the service level agreement (α), the outsourcee entity may be allowed to execute the plurality of jobs (n) with the maximum time allowable in addition to the total processing time (T). In one example, assuming the total processing time (T) as 100 minutes, and the service level agreement (α) as 5%, then the outsourcee entity may be allowed to execute the plurality of jobs (n) in 105 minutes with the maximum allowable time of 5 minutes. It is to be understood that, though the outsourcee entity is allowed to execute the plurality of jobs (n) as per the service level agreement (α), the outsourcee entity may, depending on the number of computing resources and their configuration, execute the plurality of jobs (n) even before the expiry of the total processing time (T). For example, considering the present scenario of the total processing time (T) as 100 minutes and the service level agreement (α) as 5%, the outsourcee entity may complete the execution of the plurality of jobs (n) in less than 100 minutes, for example, 90 minutes, 85 minutes, and the like. However, the outsourcee entity may be not be allowed to complete the execution of plurality of jobs (n) by taking a total processing time of greater than 105 minutes. The confidence level (1-α) depends on the service level agreement (α). In one embodiment, the confidence level (1-α) indicates maximum percentage of the plurality of jobs that is required to be executed in the total processing time (T), and as per the service level agreement (α). Hence, the outsourcee entity may have to accordingly provide the sufficient and effective number of the computing resources in order to execute the plurality of jobs (n) in the total processing time (T) and in accordance with the service level agreement (α). The determination of the number of computing resources based on the service level agreement is further explained in detail as below. In an implementation, the determining module 214 may be configured to determine the number of computing resources, as disclosed in subsequent paragraphs.

Determining Module 214

In order to determine the number of computing resources, the determining module 214, at first may compute a queue length (k) which may indicate a maximum number of jobs capable of being executed simultaneously by a single computing resource. Specifically, the queue length (k) is indicative of 'k' jobs out of the plurality of jobs (n) to be executed by the single computing resources. In order to compute the queue length (k), consider the plurality of jobs (n) is distributed in a normalized function F(x). In one implementation, the determining module may compute the queue length (k) using the normal distribution function as follows:

$$N((T-k\mu)/\sqrt{k\sigma^2} \geq 1-\alpha \quad (I)$$

Applying normal inverse function on both sides of equation (I);

$$(T-k\mu)/\sqrt{k\sigma^2} \geq \text{Normalinv}(1-\alpha;\mu;\sigma^2) \quad (II)$$

In one embodiment, assuming the mean processing time (μ), and the standard deviation (σ) are received in normalized state, values corresponding to the mean processing time (μ), and the standard deviation (σ) may be 0 and 1 respectively. Specifically, the mean processing time (μ), and the standard deviation (σ) may be having a numeric value of 0, and 1 respectively. Therefore, value of the variance in the normalized state may also be 1. Now, substituting the values of the mean processing time (μ), and the standard deviation (σ) in the normalized state, equation II may be modified as follows:

$$(T-k\mu)/\sqrt{k\sigma^2} \geq \text{Normalinv}(1-\alpha;0;1) \quad (III)$$

$$(T-k\mu)/\sqrt{k\sigma^2} \geq \gamma \quad (IV)$$

Wherein, 'γ'=Normalinv(1-α; 0; 1), and wherein 'γ' is an inverse parameter and 'k' indicates the queue length or 'k' jobs per queue or 'k' jobs being executed by the single resource. Further, 'T' indicates the total processing time.

In one embodiment, the values of the mean processing time (μ) and the variance σ² is received in order to compute the queue length (k) of maximum value. In this scenario, the value of the inverse parameter γ (Normalinv(1-α; 0; 1) may be obtained from a normal inverse table 1 as shown below. The table below provides the value of the inverse parameter γ based on the standard normal distribution, i.e. assuming the values of the mean processing time (μ) and the variance (σ²) as 0 and 1 respectively.

TABLE 1

| Normal distribution - Inverse cumulative distribution function | |
|---|---|
| Value of (1 − α) | Value of Inverse Parameter (γ) (assuming mean processing time (μ) = 0; and variance (σ²) = 1) |
| 0.50 | 0.0000 |
| 0.51 | 0.0251 |
| 0.52 | 0.0502 |
| 0.53 | 0.0753 |
| 0.54 | 0.1004 |
| . | |
| . | |
| . | |
| 0.95 | 1.6449 |
| 0.96 | 1.7507 |
| 0.97 | 1.8808 |
| 0.98 | 2.0537 |
| 0.99 | 2.3263 |

In one example, from the above table, it may be observed that, if the value of the confidence level (1-α) is 0.95 (assuming the service level agreement (α) as 5%), then the value of the inverse parameter γ will be 1.6449. Similarly, based on the service level agreement (α), the value of the inverse parameter γ may be determined using the above table 1. It is to be noted that the above table 1 depicting the normal distribution using the Inverse cumulative distribution function is known in the art. It must be noted to one skilled in the art that values of (1-α) and Inverse Parameter (γ) listed in the table 1 have been considered in order to explain an exemplary embodiment of the present disclosure and hence should not be limited to these values. Therefore, the value of inverse parameter γ may be determined corresponding to any value of (1-α) by referring to normal inverse tables available in the art. It must be understood that the above table 1 may be used for determining the inverse parameter γ only when the distribution is standard normal distribution in order to obtain the maximum value of the queue length (k). Alternatively, when the distribution is normal, expected values of the mean processing time (μ), and the standard deviation (σ) may be utilized for the determination of the inverse parameter γ. In one example, assuming the expected values of the mean processing time (μ), and the standard deviation (σ) and the service level agreement (α) are 50 minutes, 50 minutes and 5% respectively, the inverse parameter may be determined as follows:

Inverse parameter γ=((Normalinv(1-α;0;1))*expected value of variance (σ²))+expected value of mean processing time (μ) (V)

Now, substituting the expected values in equation V,

Inverse parameter γ=(1.6449*2500)+50

Thus, the value of the Inverse parameter γ in the above example will be 4162.

In one embodiment, after the determination of the inverse parameter γ, the determining module 214 may further compute the queue length (k) based on the total processing time (T), the mean processing time (μ), the standard deviation (σ), and the inverse parameter (γ) using the equation IV as follows:

According to the equation IV, $(T-k\mu)/\sqrt{k\sigma^2} \geq \gamma$,

Therefore, $(T-k\mu)-\gamma\sqrt{k\sigma^2} \geq 0$ (VI),

From the above equation VI, the determining module 214 may compute the queue length (k) using quadratic equation $k\mu+\gamma\sigma\sqrt{k} \leq T$, wherein, $\sqrt{k}=(-\gamma\sigma\pm\sqrt{\gamma^2\sigma^2+4\mu T})/2\mu$ (VII)

Therefore, the queue length (k) may be computed using equation VII, as mentioned above. The queue length indicates executing of 'k' jobs per queue, or the maximum number of jobs (k) capable of being executed simultaneously by the single computing resource.

In one embodiment, when the distribution of the plurality of jobs is exponential, and not the standard normal distribution as described above, the system 102 may be configured to compute the queue length (k) using Gamma Inverse Function. In one example, assuming F(x) indicates the exponential distribution of the plurality of jobs (n), then applying the Gamma Inverse Function on F, the queue length (k) may be computed using following relation:

$F(T;k;1/\mu)=1-\Sigma(1/n!)e^{-T/\mu}(T/\mu)^n \geq 1-\alpha$, wherein $n=0$ to $k-1$ (VII-A)

Therefore, the queue length (k) may also be computed using equation VII-A, when the distribution of the jobs is exponential. The queue length indicates executing of 'k' jobs per queue, or the maximum number of jobs (k) capable of being executed simultaneously by the single computing resource.

After the computation of the queue length (k), the determining module 214 may be configured to determine the number of computing resources. In one embodiment, the number of computing resources may be determined by the determining module 214 based on processing of the queue length (k) and the number of jobs (n). In one implementation, the determining module 214 may determine the number of computing resources based on a ceiling function of division of the plurality of jobs (n) and the queue length (k). Specifically, the number of computing resources (such as the servers, and the like) may be determined as follows, $m=\lceil(n/k)\rceil$ (VIII)

wherein, 'm' indicates the number of computing resources, and
$\lceil(n/k)\rceil$ indicates the ceiling function of (n/k), and
Wherein n indicates the number of jobs, and k indicates the queue length.

It must be understood that, the ceiling function maps a real number to the smallest following integer. Specifically, ceiling (x)=⌈x⌉ is the smallest integer not less than x. In one example, if x=12/5=2.4, then the ceiling (x)=⌈2.4⌉ which will be equal to 3. Thus, according to the present disclosure, the number of computing resources (m) is determined based on the ceiling function of the division of the plurality of jobs (n) and the queue length, i.e. the ceiling function of (n/k).

After the number of computing resources is determined, the I/O interface 204 may be adapted to display the number of computing resources (m) determined on the user device 104. The I/O interface 204 may also export the number of the computing resources determined to an external display device associated to the outsourcing entity. Further, the system 102, based on the determination of the computing resources, may be configured to allocate the executing of the plurality of jobs (n) to the computing resources, such that each computing resource is capable of executing k jobs out of the n jobs in the total processing time (T), and hence the plurality of jobs (n) may be executed in the total processing time (T).

In an exemplary embodiment, assume that the number of jobs to be executed by the software application of the outsourcing entity is 75. Further, assume that each job requires the mean processing time (μ) of 50 minutes and the standard deviation (σ) of 50 minutes. Therefore, the variance ($\sigma^2$) will be 2500 minutes. Consider the total processing time (T) required for executing 75 jobs is 240 minutes, and the service level agreement (α) is 5%. Therefore, the confidence level (1-α) will be 0.95. Consider the distribution as the standard normal distribution. Therefore, from the table 1, the value of the inverse parameter γ will be approximately 1.64. Now, in this exemplary embodiment, the queue length (k) may be computed using the equation VII as follows:

As per the equation VII, $\sqrt{k}=(-\gamma\sigma\pm\sqrt{\gamma^2\sigma^2+4\mu T})/2\mu$, Therefore, $\sqrt{k}=(-\gamma\sigma+\sqrt{\gamma^2\sigma^2+4\mu T})/2\mu$ (A) OR $\sqrt{k}=(-\gamma\sigma-\sqrt{\gamma^2\sigma^2+4\mu T})/2\mu$ (B)

Substituting the values in equation (A), $\sqrt{k}=\{-1.64*50+\sqrt{(1.64*1.64*2500+4\times240\times50)}\}/100$ Therefore, $\sqrt{k}=1.52$ (C)

Alternatively, substituting the values in equation (B), $\sqrt{k}=\{-1.64*50-\sqrt{(1.64*1.64*2500+4\times240\times50)}\}/100$ Therefore, $\sqrt{k}=-3.16$ (D)

Thus, k can be computed from (C) and (D) as $(1.52)^2=2.31$ and $(-3.16)^2=9.98$ respectively. Assuming k=2.31 is possible, hence k=3 jobs may be executed in 240 minutes at the single computing resource (e.g. a single server). Further, each job may take 50 minutes on an average processing time. It must be noted that at least two jobs may be executed by the single server, based on above computation, wherein k=2.31. Further, the number of computing resources required for the executing of 75 jobs will be ⌈75/3⌉=25 resources or 25 servers. Thus, in order to execute all the 75 jobs in the total processing time of 240 minutes, 25 servers may be required.

Exemplary embodiments discussed above may provide certain advantages. Though not required to practice aspects of the disclosure, these advantages may include those provided by the following features.

Some embodiments of the present disclosure enable the computation of the queue length (k) indicating maximum number of jobs capable of being executed simultaneously by a single server.

Some embodiments of the present disclosure enable the determination of the number of servers required for the executing of the number of jobs arriving in real time.

Some embodiments of the present disclosure enable real time allocation of the number of servers for the execution of the number of jobs based on the queue length (k) and the number of jobs.

Figure 3:
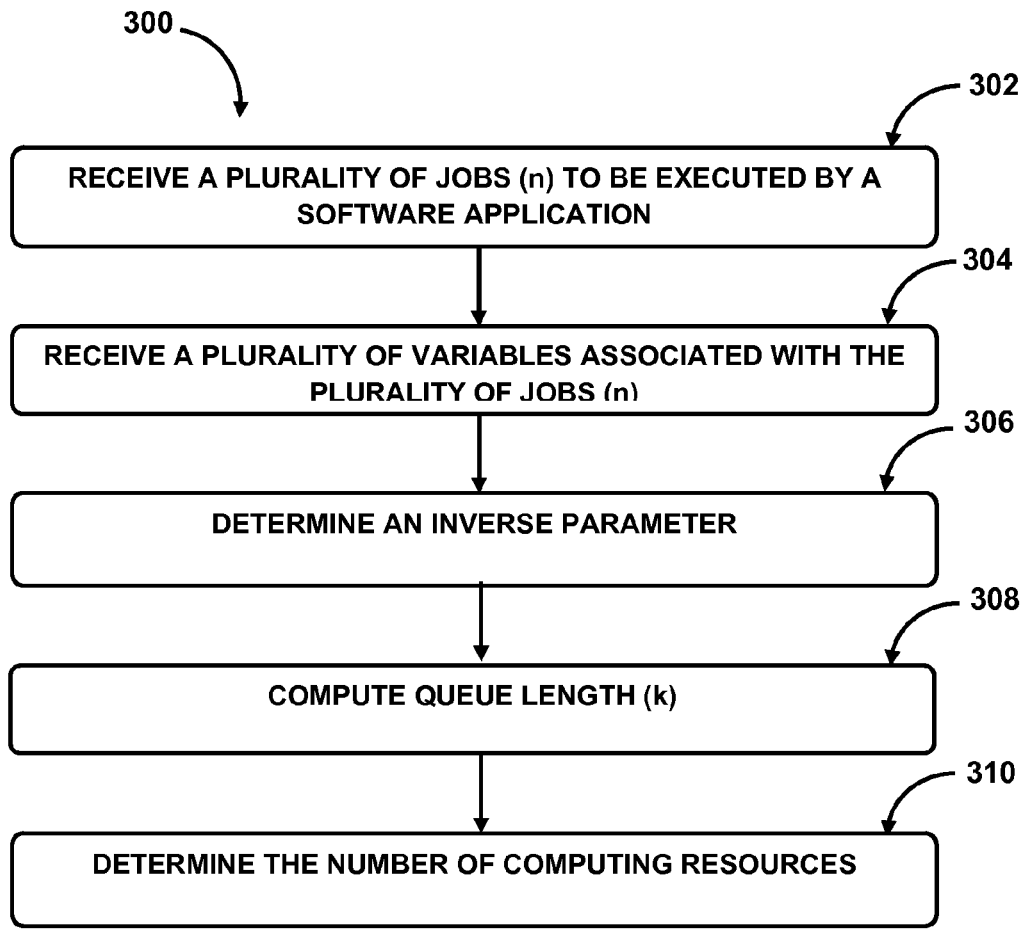
FIG. 3 illustrates a method for determining the number of computing resources for executing a plurality of jobs, in accordance with an embodiment of the present disclosure.

Referring now to FIG. 3, a method 300 for determining number of computing resources for executing a plurality of jobs is shown, in accordance with an embodiment of the present disclosure. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the disclosure described herein. Furthermore, the method can be implemented in any suitable hardware, software, firmware, or combination thereof. However, for ease of explanation, in the embodiments described below, the method 300 may be considered to be implemented in the above described system 102.

At block 302, a plurality of jobs (n) may be received. In one implementation, the plurality of jobs (n) may be received by the receiving module 212. The plurality of jobs (n) may be received from the outsourcing entity.

At block 304, a plurality of variables associated with the plurality of jobs (n) may be received. In one implementation, the plurality of variables may be received by the receiving module 212. The plurality of variables may comprise a mean processing time ($\mu$), a standard deviation ($\sigma$), a service level agreement ($\alpha$), and a confidence level (1-$\alpha$).

At block 306, an inverse parameter ($\gamma$) may be determined using the mean processing time ($\mu$), the standard deviation ($\sigma$), and the confidence level (1-$\alpha$). In one implementation, the inverse parameter ($\gamma$) may be determined by the determining module 214.

At block 308, a queue length (k) may be computed based upon the total processing time (T), the mean processing time ($\mu$), the standard deviation ($\sigma$), and the inverse parameter ($\gamma$). In one implementation, the queue length (k) may be computed by the determining module 214.

At block 310, the number of computing resources may be determined by processing the queue length (k) and the plurality of jobs (n). In one implementation, the number of computing resources may be determined by the determining module 214.

Although implementations for methods and systems for determining number of computing resources for executing a plurality of jobs have been described in language specific to structural features and/or methods, it is to be understood that the appended claims are not necessarily limited to the specific features or methods described. Rather, the specific features and methods are disclosed as examples of implementations for determining number of computing resources for executing a plurality of jobs.

We claim:

1. A method for determining a number of computing resources required for executing a plurality of jobs (n) in a total processing time (T), the method comprising:
   receiving,
       the plurality of jobs (n) to be executed by a software application, and
       a plurality of variables associated with the plurality of jobs (n), wherein the plurality of variables comprises a mean processing time ($\mu$) a standard deviation ($\sigma$), a service level agreement ($\alpha$), and a confidence level (1-$\alpha$), and
   wherein the mean processing time ($\mu$) indicates average time required for executing each job, and
   wherein the standard deviation ($\sigma$) indicates a variance in the mean processing time ($\mu$), and
   wherein the service level agreement ($\alpha$) is indicative of a maximum time allowable in addition to the total processing time (T) for executing the plurality of jobs (n);
   determining, via a processor, a inverse parameter ($\gamma$) using the mean processing time ($\mu$), the standard deviation ($\sigma$), and the confidence level (1-$\alpha$);
   computing, via the processor, a queue length (k) based upon the total processing time (T), the mean processing time ($\mu$), the standard deviation ($\sigma$), and the inverse parameter ($\gamma$), wherein the queue length (k) indicates a maximum number of jobs capable of being executed simultaneously by a single computing resource,
   wherein the queue length (k) is computed using a formula $\sqrt{k} = -\sigma\gamma \pm \sqrt{(\sigma^2\gamma^2 + 4T\mu)}/2\mu$, wherein k is the queue length, $\sigma$ is the standard deviation, $\gamma$ is the inverse parameter, T is the total processing time and $\mu$ is the mean processing time;
   processing the queue length (k) and the plurality of jobs (n) in order to determine the number of computing resources required for the execution of the plurality of the jobs (n); and
   executing by the software application the plurality of lobs using the determined number of computing resources.

2. The method of claim 1, wherein the mean processing time ($\mu$), and the standard deviation ($\sigma$) are received in normalized state, and
   wherein the mean processing time ($\mu$) and the standard deviation ($\sigma$) have a numeric value of 0 and 1 respectively.

3. The method of claim 1, wherein the confidence level (1-$\alpha$) indicates maximum percentage of the plurality of jobs to be executed in the total processing time (T).

4. The method of claim 1, wherein the number of computing resources is determined based on a ceiling function of division of the plurality of jobs (n) and the queue length (k).

5. A system for determining a number of computing resources required for executing a plurality of jobs (n) in a total processing time (T), the system comprising:
   a processor; and
   a memory coupled to the processor, wherein:
       the processor executing a plurality of modules stored in the memory, and wherein the plurality of modules comprising:
           a receiving module configured to receive,
               the plurality of jobs (n) to be executed by a software application, and
               a plurality of variables associated with the plurality of jobs (n), wherein the plurality of variables comprises a mean processing time ($\mu$), a standard deviation ($\sigma$), a service level agreement ($\alpha$), and a confidence level (1-$\alpha$), and wherein the mean processing time (μ) indicates average time required for executing each job, and wherein the standard deviation (σ) indicates a variance in the mean processing time (μ), and wherein the service level agreement (α) is indicative of a maximum time allowable in addition to the total processing time (T) for executing the plurality of jobs (n); and a determining module configured to, determine a inverse parameter (γ) using the mean processing time (μ), the standard deviation (σ), and the confidence level (1-α), compute a queue length (k) based upon the total processing time (T), the mean processing time (μ), the standard deviation (σ), and the inverse parameter (γ), wherein the queue length (k) indicates a maximum number of jobs capable of being executed simultaneously by a single computing resource, wherein the queue length (k) is computed using a formula $\sqrt{k} = -\sigma\gamma \pm \sqrt{(\sigma^2\gamma^2 + 4T\,\mu)}/2\mu$, wherein k is the queue length, σ is the standard deviation, σ is the inverse parameter, T is the total processing time and μ is the mean processing time:

process the queue length (k) and the plurality of jobs (n) in order to determine the number of computing resources required for the execution of the plurality of the jobs (n)); and wherein the software application executes the plurality of jobs using the determined number of computing resources.

6. The system of claim 5, wherein the number of computing resources is determined based on a ceiling function of division of the plurality of jobs (n) and the queue length (k).

7. A non-transitory computer program product for determining a number of computing resources required for executing a plurality of jobs (n) in a total processing time (T), the computer program product comprising a set of instructions, the set of instructions comprising instructions for:

receiving, the plurality of jobs (n) to be executed by a software application, and a plurality of variables associated with the plurality of jobs (n), wherein the plurality of variables comprises a mean processing time (μ), a standard deviation (σ), a service level agreement (α), and a confidence level (1-α), and wherein the mean processing time (α) indicates average time required for executing each job, and wherein the standard deviation (σ) indicates a variance in the mean processing time (μ), and wherein the service level agreement (α) is indicative of a maximum time allowable in addition to the total processing time (T) for executing the plurality of jobs (n);

determining a inverse parameter (γ) using the mean processing time (μ), the standard deviation (σ), and the confidence level (1-α);

computing a queue length (k) based upon the total processing time (T), the mean processing time (μ), the standard deviation (σ), and the inverse parameter (γ), wherein the queue length (k) indicates a maximum number of jobs capable of being executed simultaneously by a single computing resource;

wherein the queue length (k) is computed using a formula $\sqrt{k} = -\sigma\gamma \pm \sqrt{(\sigma^2\gamma^2 + 4T\,\mu)}2\mu$, wherein k is the queue length, σ is the standard deviation, γ is the inverse parameter, T is the total processing time and μ is the mean processing time;

processing the queue length (k) and the plurality of jobs (n) in order to determine the number of computing resources required for the execution of the plurality of the jobs (n); and executing by the software application the plurality of jobs using the determined number of computing resources.

* * * * *